United States Patent [19]
Lyons et al.

[11] Patent Number: 5,982,646
[45] Date of Patent: Nov. 9, 1999

[54] VOLTAGE CLAMP SNUBBERS FOR THREE LEVEL CONVERTER

[75] Inventors: James Patrick Lyons, Niskayuna, N.Y.; Paul Martin Espelage, Salem, Va.; Vlatko Vlatkovic; Jing Wang, both of Schenectady, N.Y.

[73] Assignee: General Electric Company, Schenectady, N.Y.

[21] Appl. No.: 09/108,043

[22] Filed: Jun. 30, 1998

[51] Int. Cl.[6] .................................................. H02M 7/521
[52] U.S. Cl. .............................. 363/58; 363/54; 363/128; 363/136
[58] Field of Search ................................... 363/27, 28, 52, 363/53, 54, 55, 56, 57, 58, 125, 128, 131, 132, 135, 136, 137

[56] References Cited

U.S. PATENT DOCUMENTS

| | | | |
|---|---|---|---|
| 4,674,024 | 6/1987 | Paice et al. ................................ | 363/71 |
| 4,855,893 | 8/1989 | Kratz ......................................... | 363/136 |
| 4,881,159 | 11/1989 | Holtz et al. ................................ | 363/58 |
| 5,274,542 | 12/1993 | Tanaka et al. ............................. | 363/96 |
| 5,383,108 | 1/1995 | Okayama .................................. | 363/137 |
| 5,400,242 | 3/1995 | Ando et al. ................................ | 363/136 |
| 5,481,448 | 1/1996 | Nakata et al. ............................. | 363/137 |
| 5,535,114 | 7/1996 | Horie et al. ............................... | 363/58 |
| 5,608,595 | 3/1997 | Gourab et al. ............................ | 361/79 |
| 5,612,628 | 3/1997 | Nicollian et al. ........................ | 324/769 |
| 5,627,742 | 5/1997 | Nakata et al. ............................. | 363/98 |
| 5,684,688 | 11/1997 | Rouaud et al. ........................... | 363/132 |
| 5,841,645 | 11/1998 | Sato ......................................... | 363/43 |

OTHER PUBLICATIONS

A. Nabae, "A New Neutral–Point–Clamped PWM Inverter", IEEE Trans. On Industry Applications, vol. 1A–17, No. 5, Sep./Oct. 1981, pp. 518–523.

Theodor Salzmann and Gerhard Kratz, "High Power Drive with Advanced Power Circuitry and Improved Digital Control", IEEE Trans. on Industry Applications, vol. 29, No. 1, Jan./Feb. 1993, pp. 168–174.

N. Kawakami, Y. Jifuku, S. Ueda, M. Hombu, and A. Ueda, "A Large Capacity GTO Inverter with Low–Loss Snubber Circuits", IEEE, 1991, pp. 892–897.

B. Suh, D. Hyun, and H. Choi, "A Circuit Design for Clamping an Overvoltage in Three–Level GTO Inverters," IEEE IECON Conference Proceedings 1994, pp. 651–656.

J. Suh, B. Suh, and D. Hyun, "A New Snubber Circuit for High Efficiency and Overvoltage Limitation in Three–Level GTO Inverters", IEEE Transactions on Industrial Electronics, vol. 44, No. 2, Apr. 1997, pp. 145–156.

H. Okayama, M. Koyama, S. Tamai, T. Fujii, R. Uchida, S. Mizoguchi, H. Ogawa, and Y. Shinomura, "Large Capacity High Performance 3–Level GTO Inverter System for Steel Main Rolling Mill Drives", IEEE IAS Conference 1996, pp. 174–179.

*Primary Examiner*—Adolf Deneke Berhane
*Attorney, Agent, or Firm*—Ann M. Agosti; Jill M. Breedlove

[57] ABSTRACT

A three-level NPC converter includes at least one phase leg including four series coupled electrical switches having a first pair junction between the first two switches and a second pair junction between the second two switches. First and second inner switch snubber capacitors are coupled in series at a neutral junction. First and second inner switch snubber diodes are respectively coupled to the first and second pair junctions and respectively coupled at first and second inner diode-capacitor junctions to the first and second inner switch snubber capacitors. First and second inner switch snubber resistors are respectively coupled between the first and second inner diode-capacitor junctions and respective portions of a DC bus. In one embodiment, the NPC converter further includes first and second outer switch snubber diodes coupled between respective first and second inner diode-capacitor junctions and respective portions of the DC bus. This embodiment may further include first and second outer switch snubber capacitors coupled in parallel with respective first and second inner switch snubber capacitors.

11 Claims, 10 Drawing Sheets

VOLTAGE CLAMP SNUBBERS FOR THREE LEVEL CONVERTER

BACKGROUND OF THE INVENTION

The present invention relates generally to three-level converters and, more particularly, to a voltage clamp snubber for use in three-level converters.

Snubbers have been designed to provide safe switching of GTO (gate turn-off thyristor) power switches in both two and three level converter (inverter or rectifier) topologies. A GTO switch requires local control of dv/dt (voltage changes with respect to time) during switch turn-off which typically is accomplished by forming a shunt capacitor path around the switch. The resulting snubber arrangements for three-level converters are complicated and, in addition to creating parasitic energy losses, generally result in significant power losses as the local shunt capacitors dump their charge into the GTO during switch turn-on. Attempts have been made to design regenerative snubbers circuits to recover this energy. In general, these regenerative schemes are considered complex.

Voltage clamp type snubbers have been successfully used in two-level BJT (bipolar junction transistor) and IGBT (insulated gate bipolar transistor) converters. These switches do not require dv/dt control. Consequently, the clamp snubber can be used to limit switch overrings and thereby create a more robust converter.

IGCT (Integrated Gate Commutated Thyristor) switches can be operated in a converter without snubbers or clamping circuits. However, in a practical high power converter circuit, the parasitic inductance levels necessary for true snubberless converter operation cannot easily be achieved.

A neutral point clamped (NPC) converter can be operated with conventional resistor-capacitor-diode snubbers around each switch as shown in FIG. 2 of Kawakami et al., "A Large Capacitor GTO Inverter with Low-Loss Snubber Circuits," IEEE May 1991 publication number 0-7803-0453, pages 892–897. There are several limitations with this embodiment including the fact that the snubber capacitor completely discharges at each switch turn-on, involving a significant $CV^2/2$ energy loss each switching cycle with no practical benefit. Another limitation is that the asymmetric nature of the clamp diodes in the three-level inverter topology introduces a voltage imbalance between the inner and outer switch snubber capacitors and thereby decreases the switch safety margin.

SUMMARY OF THE INVENTION

It is therefore seen to be desirable to provide active power electronic switches in a neutral point clamped three-level converter a voltage clamp snubber which can be used to minimize energy loss and to minimize voltage overrings at switch turn-off so as to thereby maintain the switches within their safe operating area of voltage and current.

The present invention provides a number of related voltage clamp type snubber arrangements for both the inner and outer switches of a NPC three-level converter. These voltage clamp snubbers can be used with any switch which does not require dv/dt control at switch turn-off. Examples of such switches include IGBTs and IGCTs. The voltage clamp snubber of the present invention will safely absorb the moderate amount of energy stored in the parasitic inductance of the converter buswork at switch turn-off and can be configured either to passively dissipate the captured energy in resistors or to recapture the energy via a regenerative chopper circuit.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
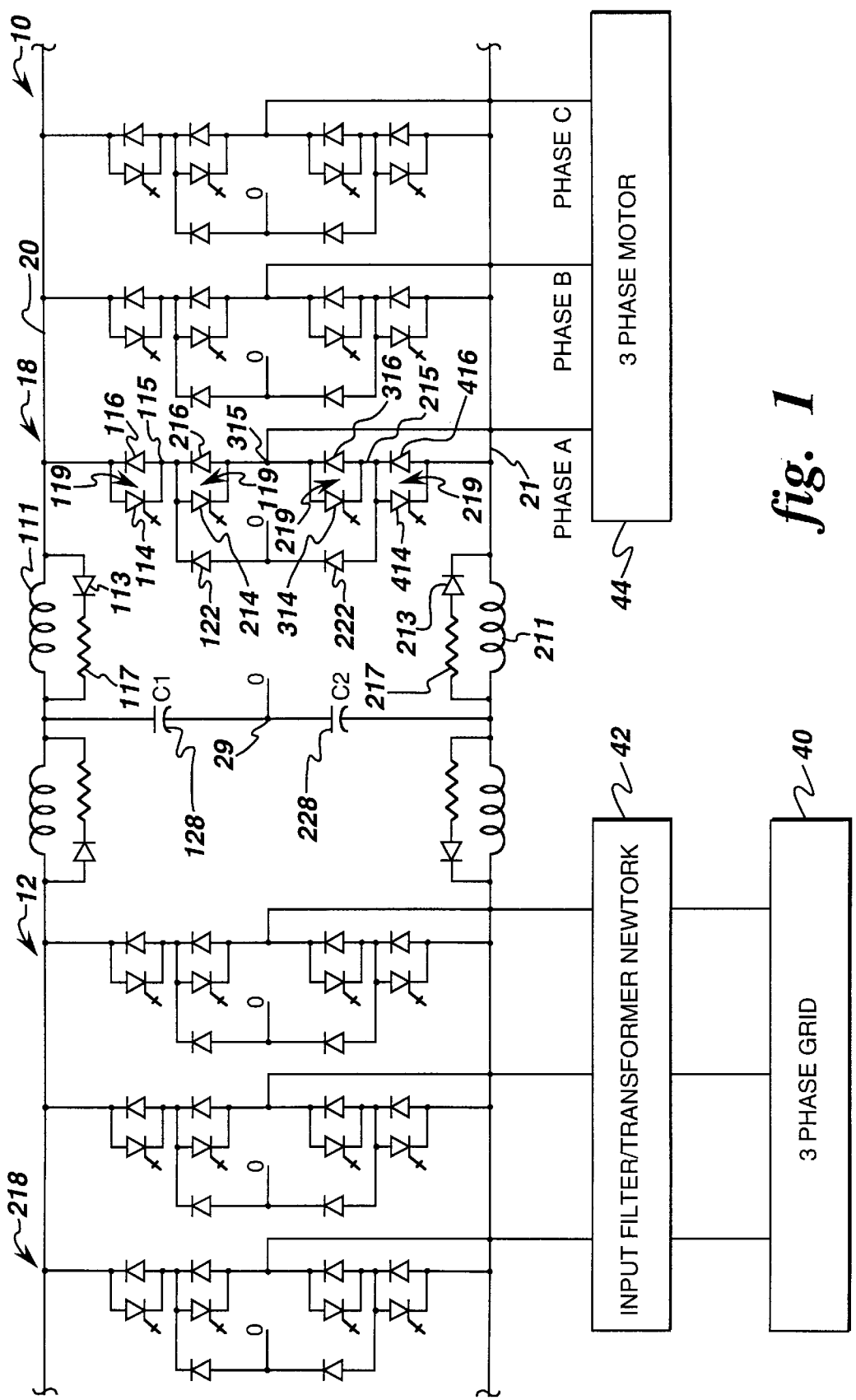
FIG. 1 is a circuit diagram of two neutral point clamped (NPC) three level converters.

In the circuit diagram of FIG. 1, two neutral point clamped (NPC) three level converters 10 and 12 are shown. One of the converters is a three level input power conversion stage (shown as input rectifier bridge 12) and the other of the converters is a three level output power conversion stage (shown as NPC inverter 10) for supplying power to a motor 44. The NPC inverter includes three phase legs 18 which each include four electrical switches 114, 214, 314, and 414 which are shown as IGCTs (Integrated Gate Commutated Thyristor). Other useful switches include switches such as IGBTs (Insulated Gate Bipolar Transistors), for example. Although three phase legs are shown for each converter, the present invention applies to NPC three level converters having one or more phase legs and is not limited to embodiments having three phase legs.

The first through fourth switches 114, 214, 314, and 414 are coupled in series at junctions 115, 315, and 215. A first pair 119 of the series coupled switches is coupled between a positive DC bus 20 and the motor, and a second pair 219 of the series coupled switches is coupled between a negative DC bus 21 and the motor. The switches coupled to the motor are referred to herein as inner switches, and the switches coupled to the DC bus are referred to herein as outer switches.

The switches are paired with anti-parallel freewheeling diodes 116, 216, 316, and 416 to accommodate the inductive motor load currents. Each freewheeling diode is coupled in parallel to a respective switch. A controller (not shown) such as a computer or microprocessor is used for controlling each of the switches.

Each phase leg 18 of the power conversion stage thus has four switch and diode pairs spanning the DC bus as well as two clamping diodes 122 and 222. Depending on the switch commanded state per phase, and the instantaneous polarity of the load current in that phase, the load current path can be through switches, freewheeling diodes, or clamping diodes. With four switches spanning the DC bus, each with a maximum working DC voltage equal to one half the DC link voltage (Vdc/2), twice the output voltage for a given switch voltage rating can be obtained as compared to a two level converter.

The DC bus is spit into two halves with a dc neutral point (0), shown as neutral junction 29, formed at the center of series connected dc link capacitors 128 and 228 (C1 & C2). Clamping diodes 122 and 222 are connected between capacitor bank midpoint (the neutral junction 29) and the junctions 115 and 215 which couple switches 116 and 216 and switches 316 and 416, respectively, to keep the maximum DC working voltage across any switch from exceeding one half of the DC bus voltage (Vdc/2), provided the DC filter capacitor midpoint voltage is maintained at Vdc/2. Regulators are built into the control system to keep the midpoint voltage at Vdc/2 to guard against long term unequal discharge of the two capacitor bank halves.

For switches which are thyristor switches with an avalanche turn-on characteristic, reactors (inductors) 111 and 211 are used to limit di/dt (the change of current with respect to time) and diode reverse recovery in the hard-switched converter. The converter, as illustrated, has common di/dt reactors shared amongst the three phases. Alternatively, di/dt limit reactors can be supplied for each phase in order to limit phase interactions. Reactor reset diodes 113 and 213 and reactor reset resistors 117 and 217 can dissipate energy stored in the di/dt limit reactors during turn-off of outer switches 114 and 414.

Input rectifier bridge 12 has a similar structure as NPC inverter 10 with three phase legs 218 and serves as a PWM (pulse width modulating) boost converter regulating the overall DC bus voltage. Bridge 12 interfaces to a utility grid 40 through an input stage filter assembly 42 which will filter the high frequency switching harmonics from the three phase converter current.

Figure 2:
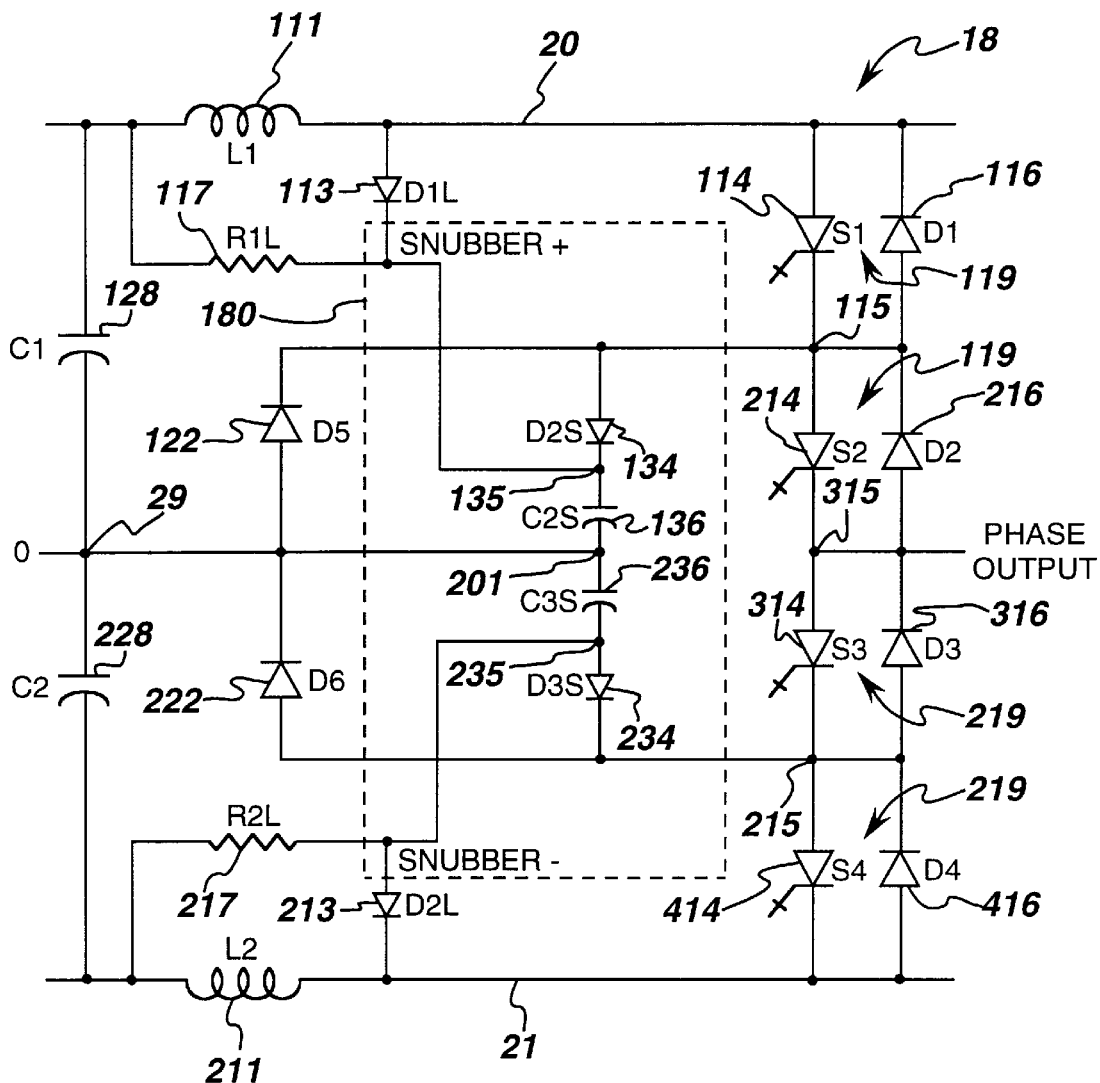
FIG. 2 is a circuit diagram of an inner switch voltage clamp snubber.
Figure 3:
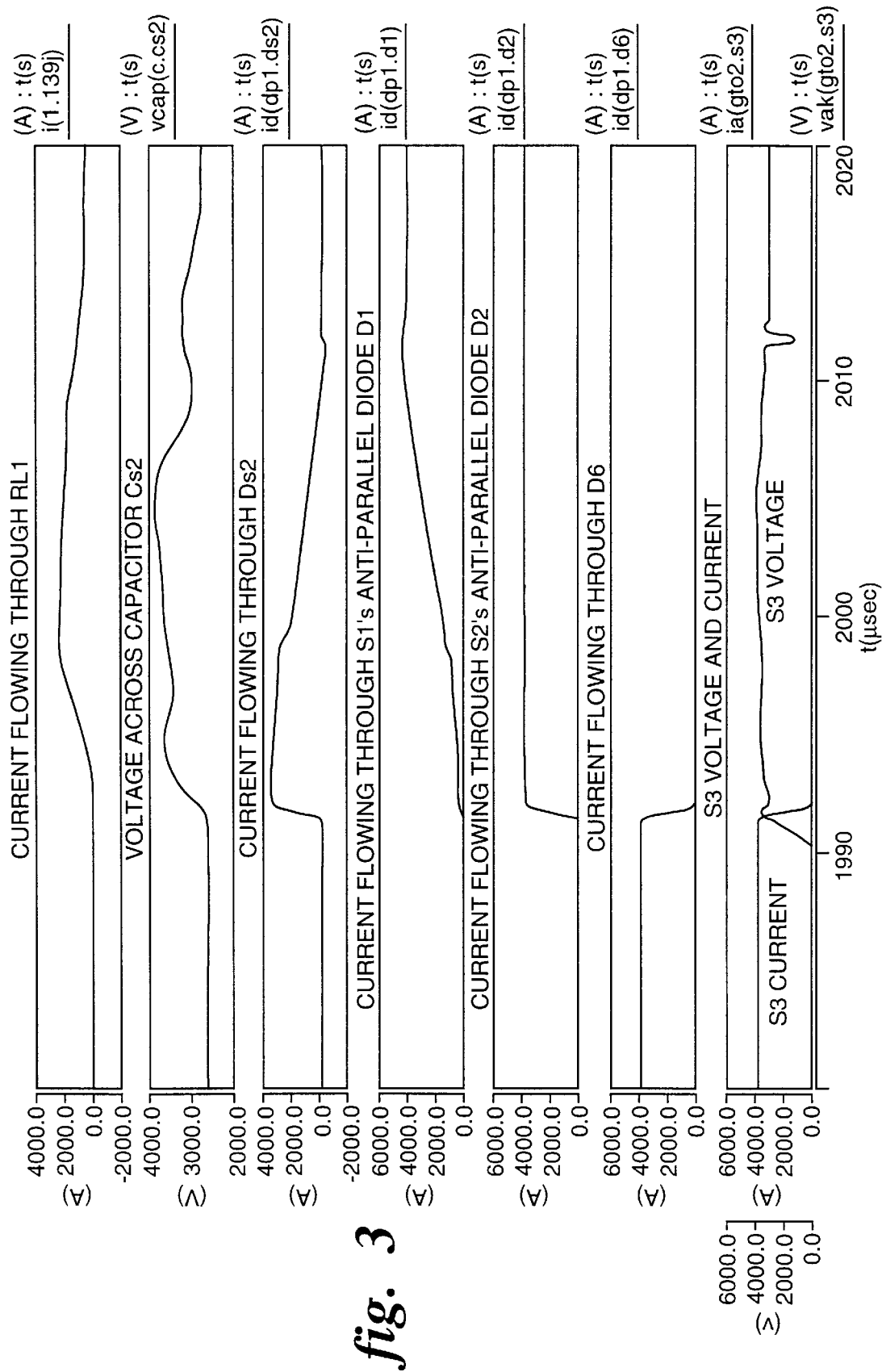
FIG. 3 is a graph of simulated turn-off waveforms for the embodiment of FIG. 2.

FIG. 2 is a circuit diagram of an inner switch voltage clamp snubber 180, and FIG. 3 is a graph of simulated turn-off waveforms for the embodiment of FIG. 2. First and second inner switch snubber capacitors 136 and 236 (C2S and C3S) are referenced to neutral junction 29. First and second inner switch snubber diodes 134 and 234 (D2S and D3S) link the snubber capacitors to the switch junctions 115 and 215.

Prior to turn-off of switch 314 (shown at time 1900 microseconds in FIG. 3), inner snubber capacitor 136 is charged to Vdc/2. During the turn-off of switch 314, inner switch snubber diode 134 and capacitor 136 serve as a voltage clamp. As an example of device turn-off, if the NPC phase leg 18 is in a state where switches 114 and 414 are off and switches 214 and 314 are on with load current entering the pole and conducting through switch 314 to motor 44 (shown in FIG. 1) and through diode 222 to dc-neutral 29, when switch 314 begins to turn-off and its anode-cathode voltage exceeds Vdc/2, the difference between the switch current and the load current is diverted into charging capacitor (inner switch snubber capacitor 136) through freewheeling diode 216 and snubber diode 134. When switch 314 and clamp diode 222 complete the turn-off process (shown at time 2010 microseconds in FIG. 3) and can support voltage, the load current diverts through freewheeling diodes 216 and 116 to positive DC bus 20 and thus completes the current commutation from the switch to the freewheeling diodes.

During the transient conditions of the turn-off process, it is desirable to have minimum inductance in the loop consisting of switch 314, free-wheeling diode 216, inner switch snubber diode 134, inner switch snubber capacitor 136, and clamp diode 222 in order to minimize voltage overring and maximize switch safety operating margin. The excess charge transiently built up in inner switch snubber capacitor 136 during switch 314 turn-off can be bled off by a bleed resistor 117 (an inner switch snubber resistor coupled to an inner diode-capacitor junction 135) and dissipated, restoring the inner switch snubber capacitor voltage to Vdc/2 prior to the next turn-off of switch 314. As illustrated in FIG. 2, the bleed resistor is combined with the reactor reset resistor to minimize the number of parts in the inverter. Alternatively, a separate bleed resistor can be coupled to the positive DC bus.

Inner switch snubber diode 234 and inner switch snubber capacitor 236 form a voltage clamp for switch 214 and operate in a similar manner as discussed with respect to the clamping of switch 314.

Figure 4:
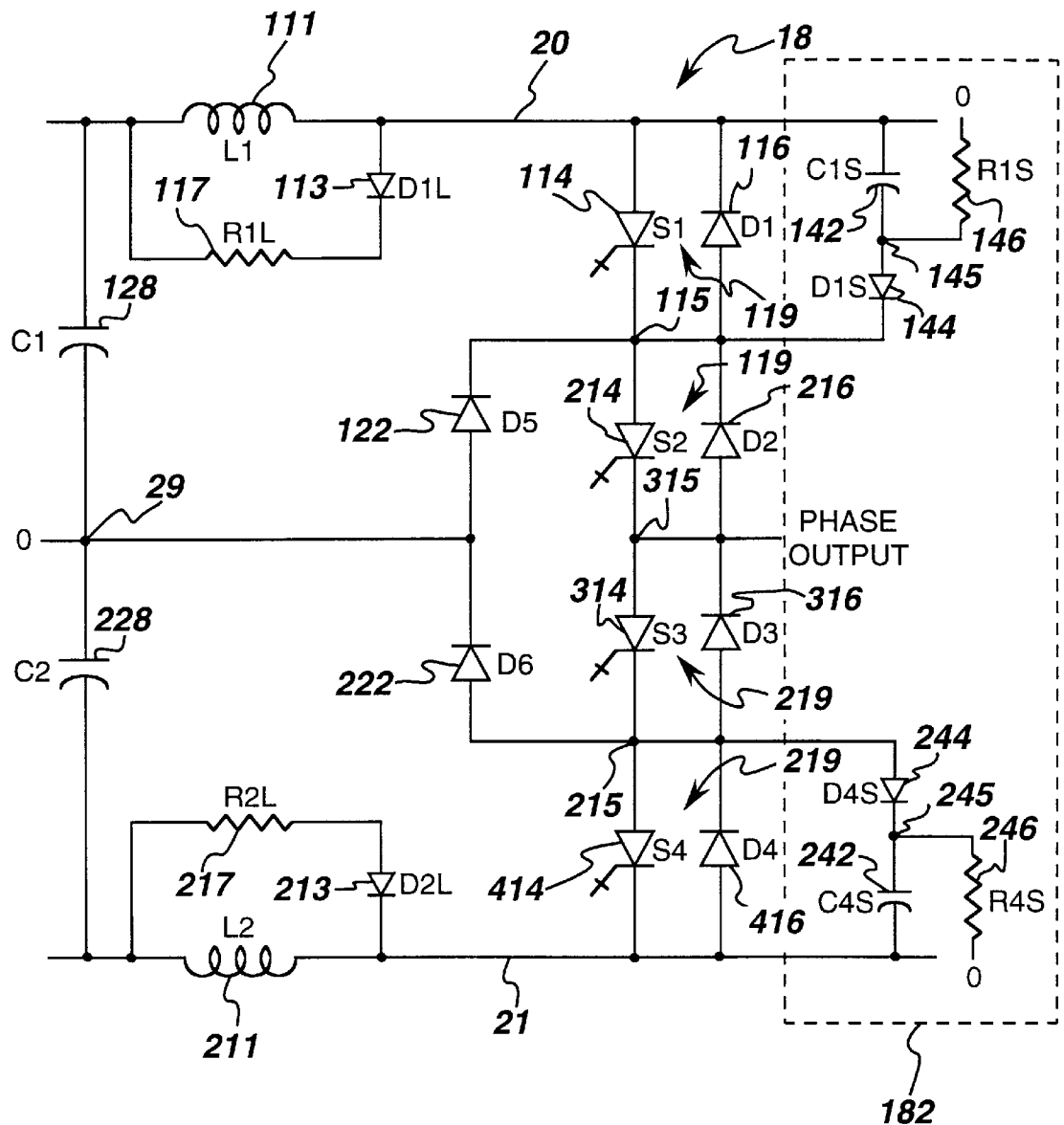
FIG. 4 is a circuit diagram of an outer switch voltage clamp snubber.

FIG. 4 is a circuit diagram of an outer switch voltage clamp snubber 182 including first and second outer switch snubber capacitors 142 and 242 and first and second outer switch snubber diodes 144 and 244. Capacitor 142 and diode 144 are coupled in series between the positive DC bus and switch pair junction 115 and form a tightly coupled voltage clamp in parallel with switch 114. Prior to the turn-off of switch 114, capacitor 142 is pre-charged to Vdc/2. During turn-off, when the voltage across switch 114 exceeds Vdc/2, the load current transiently diverts through capacitor 142 and diode 144 until diode 122 picks up the load current. The excess charge built up in capacitor 142 during switch 114 turn-off is subsequently bled off via outer switch snubber resistor 146 (coupled between the neutral junction and a junction 145 between the capacitor and the diode). During the turn-off transient, it is desirable to have minimum inductance in the loop of switch 114, capacitor 142, and diode 144 in order to minimize voltage overring and maximize switch safety operating margin. Capacitor 242, diode 244, and resistor 246 perform similar functions for switch 414.

Figure 5:
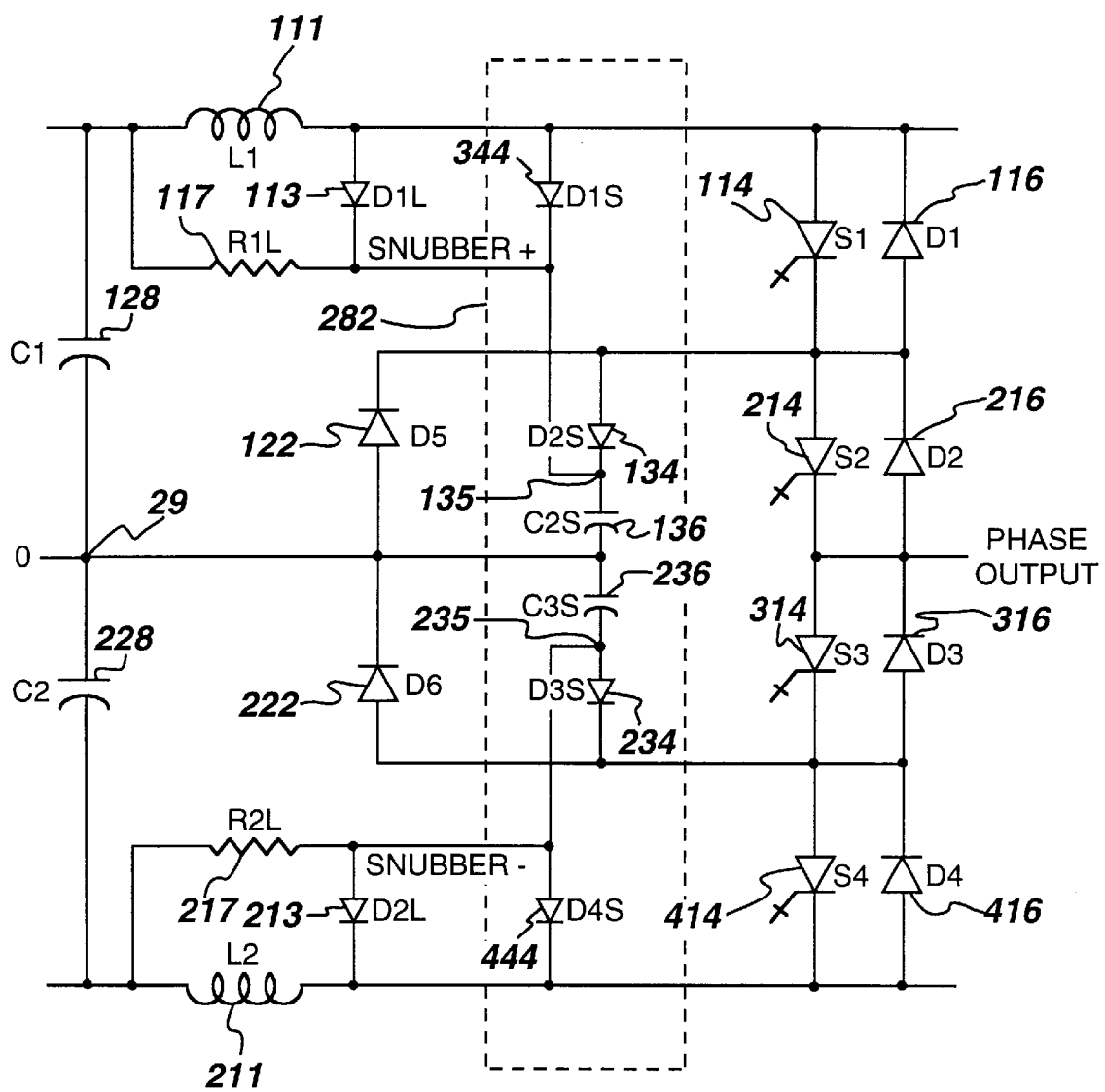
FIG. 5 is a circuit diagram of another outer switch voltage clamp snubber.

FIG. 5 is a circuit diagram of another outer switch voltage clamp snubber 282 in which inner switch snubber capacitors 136 and 236 and the reactor reset resistors 117 and 217 also serve, in combination with outer switch snubber diodes 344 and 444, to clamp outer switches 114 and 414. First outer switch snubber diode 344 is coupled between the first inner diode-capacitor junction 135 and the positive DC bus. Upon switch 114 turn-off, the load current transiently diverts through diode 344 into capacitor 136. During the turn-off transient conditions, it is desirable to have minimum inductance in the loop consisting of switch 114, diode 344, capacitor 136, and diode 122 in order to minimize voltage overring and maximize switch operating margin. Although the FIG. 5 embodiment requires less circuit elements to achieve voltage clamping of both inner and outer switches than the outer switch voltage clamp embodiment of FIG. 4 would require when combined with the inner switch clamp embodiment of FIG. 2, in practice, minimizing inductance levels in the FIG. 5 loop may be difficult. Diode 444 performs a similar voltage clamping function for switch 414 as diode 344 provides for switch 114.

Figure 6:
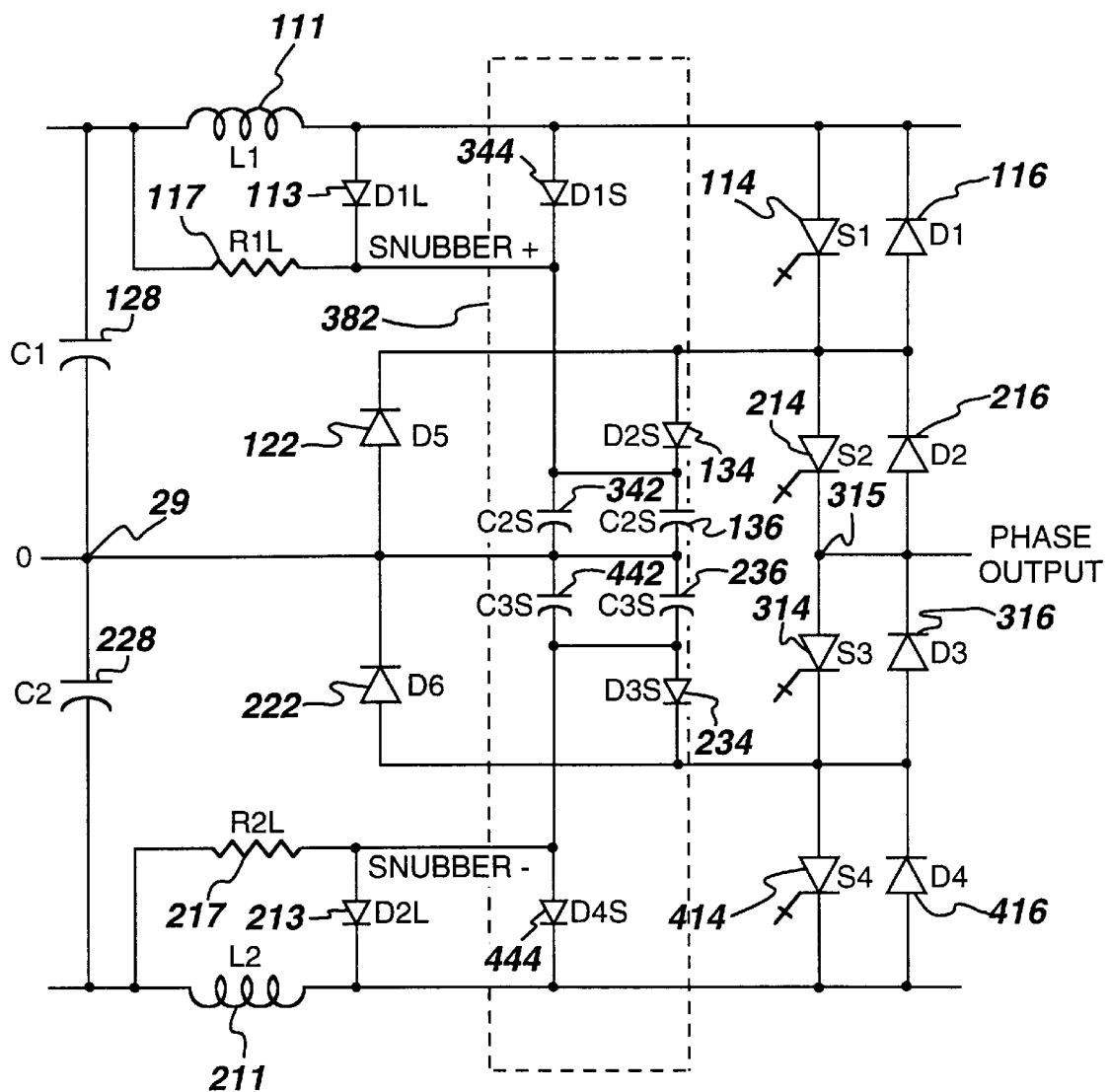
FIG. 6 is a circuit diagram of another outer switch voltage clamp snubber.

FIG. 6 is a circuit diagram of another outer switch voltage clamp snubber 382. This embodiment is similar to the embodiment of FIG. 5 with the addition of first and second outer switch snubber capacitors 342 and 442. In this embodiment, first outer switch snubber diode 344 and capacitor 342 are provided for switch 114. Capacitor 342 is effectively in parallel with capacitor 136 but can be physically placed close to switch 114 in order to minimize the parasitic inductance in the switch 114, diode 344, capacitor 342, diode 122 loop. Outer switch snubber diode 444 and capacitor 442 perform a similar function for switch 414.

Figure 7:
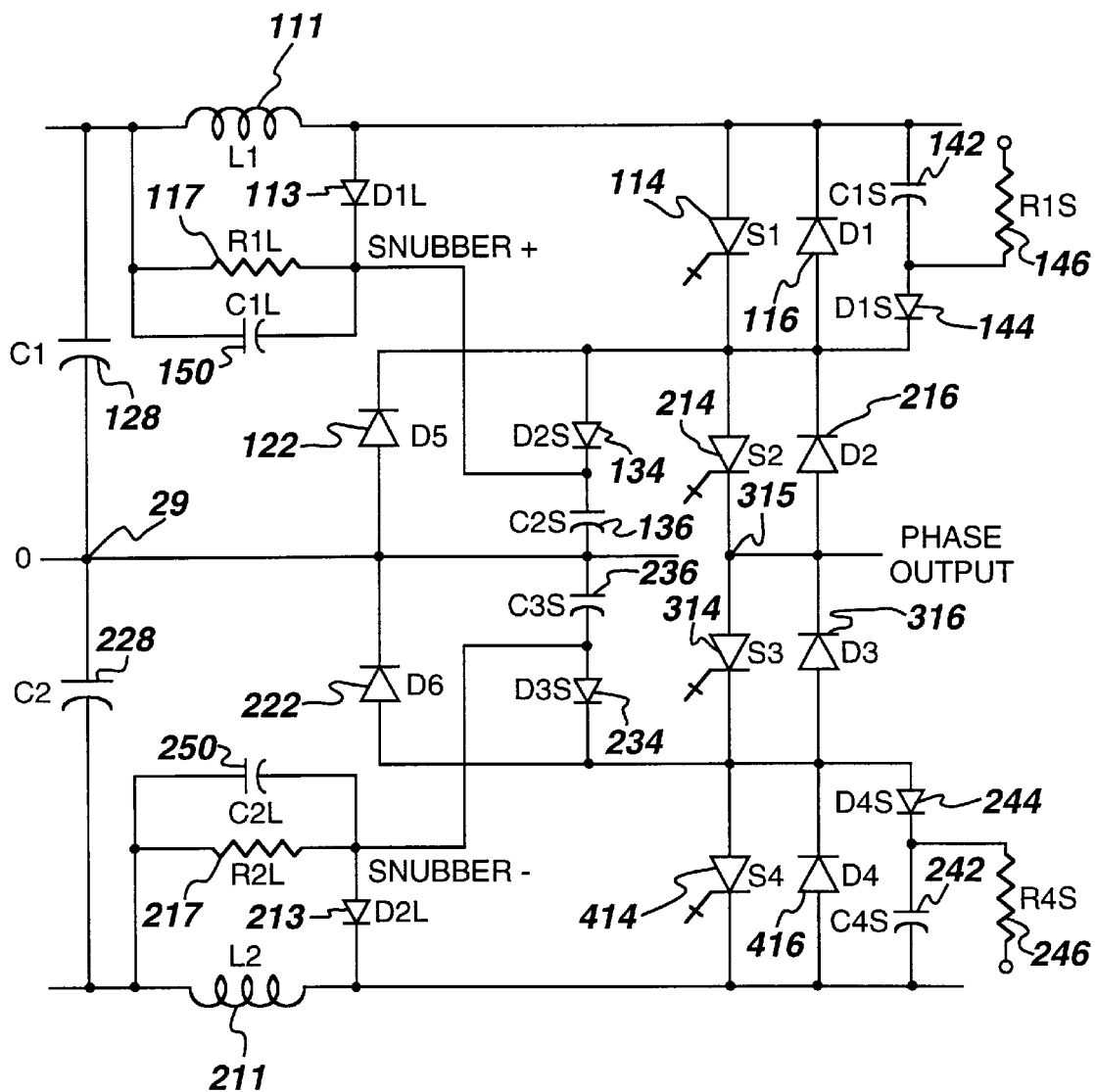
FIG. 7 is a circuit diagram of showing the addition of an RC passive bleed/reset circuit.

FIG. 7 is a circuit diagram showing the addition of an RC passive bleed/reset circuit fabricated with reset capacitors 150 and 250 and the reactor reset resistors 117 and 217 which act as RC reset circuits for the series connected di/dt limit reactors 111 and 211. These circuits alter the shape of the reset voltage pulses across the reactors and speed flux discharge while minimizing peak dc bus voltage.

Figure 8:
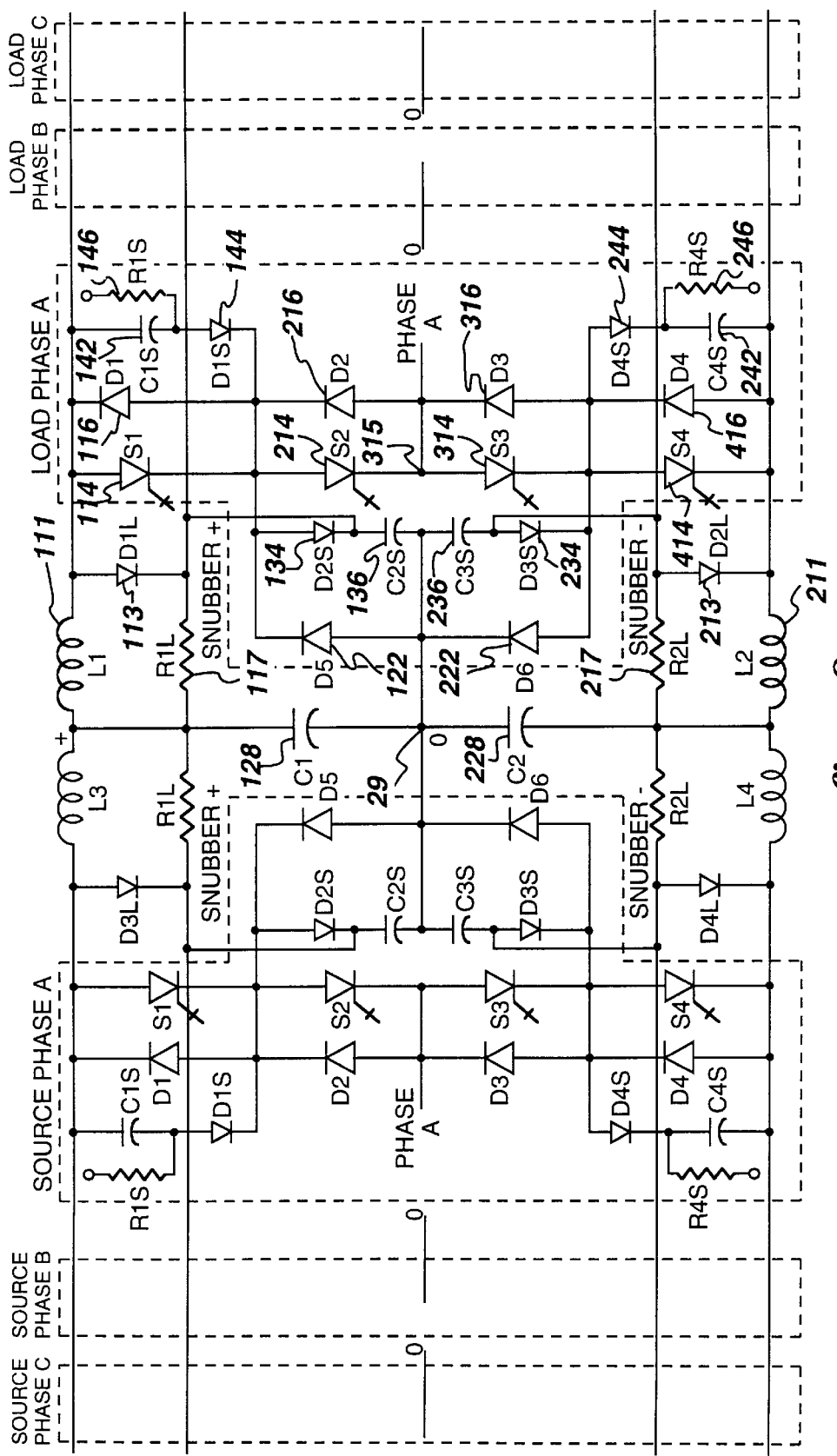
FIG. 8 is a circuit diagram illustrating voltage clamp snubbers in a back-to-back converter system.

FIG. 8 is a circuit diagram illustrating the voltage clamp snubbers in a four quadrant back-to-back converter system which combines the inner switch voltage clamp snubber embodiment of FIG. 2 with the outer switch voltage clamp snubber embodiment of FIG. 4. Any of the embodiments of FIGS. 5–7 could alternatively be used in this back-to-back converter system.

Figure 9:
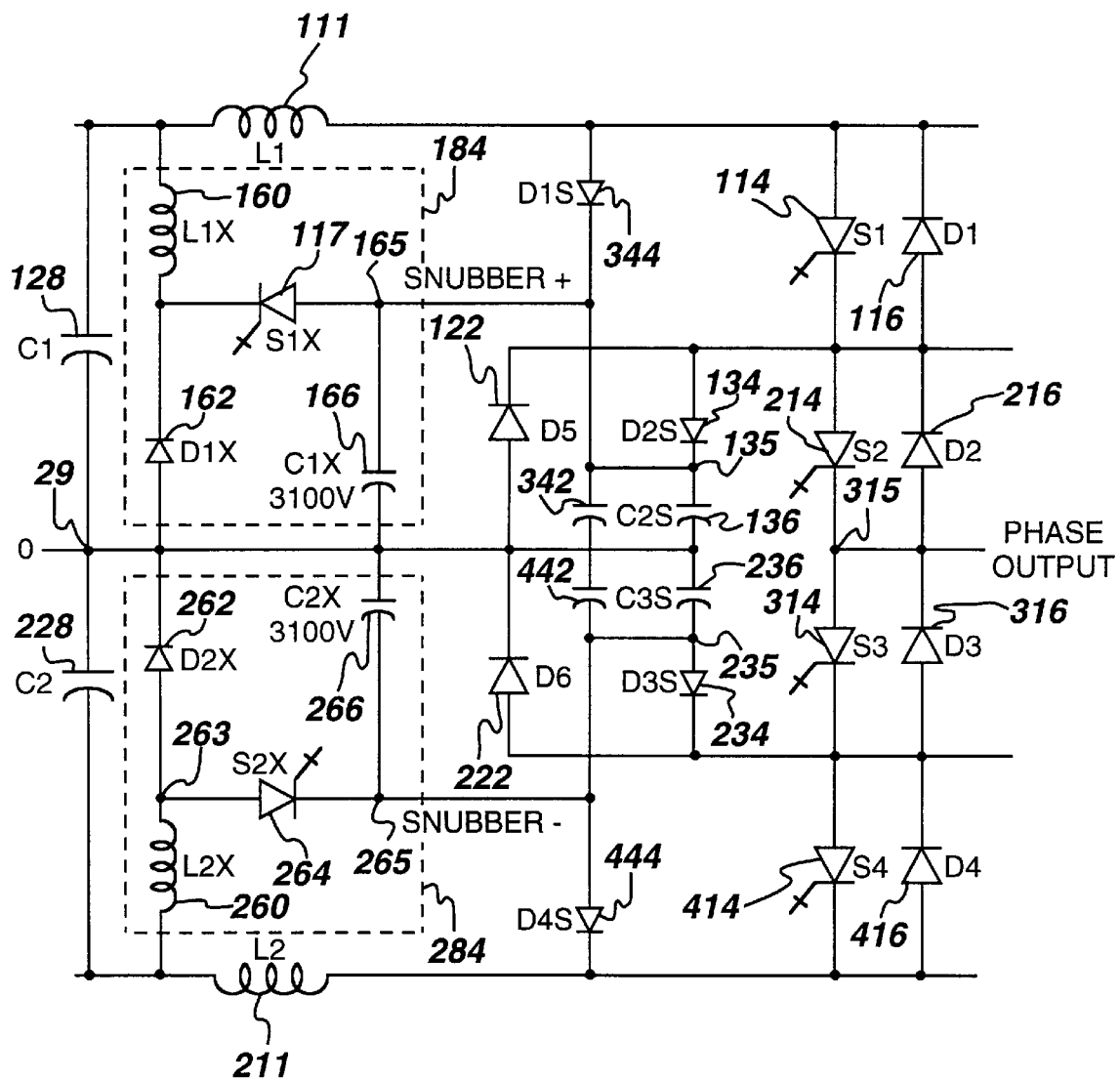
FIG. 9 is a circuit diagram of a regenerative voltage clamp snubber.

FIG. 9 is a circuit diagram of the embodiment of FIG. 6 further including a buck converter pair 184 and 284 which provides for recovery of the excess energy captured in first and second inner switch snubber capacitors 136 and 236. Switch 164, inductor 160, diode 162, and capacitor 166 form a buck converter 184 which will regenerate any energy dumped into the inner switch snubber capacitor 136 and hence into capacitor 166. The buck converter is controlled to regulate the voltage across capacitor 166 slightly above the Vdc/2 level to optimize the reset time of reactor 111. Switch 264, inductor 260, diode 262, and capacitor 266 perform a similar function for the lower half of the dc link and lower snubber bus.

Alternative regenerative clamp type circuit topologies can again be obtained by applying the clamp circuit variations as illustrated in FIGS. 4, 5, and 7. The regenerative circuit topology is attractive in that the significant energy captured in the di/dt limit reactor is recovered in addition to the energy captured in the parasitic circuit inductance.

Figure 10:
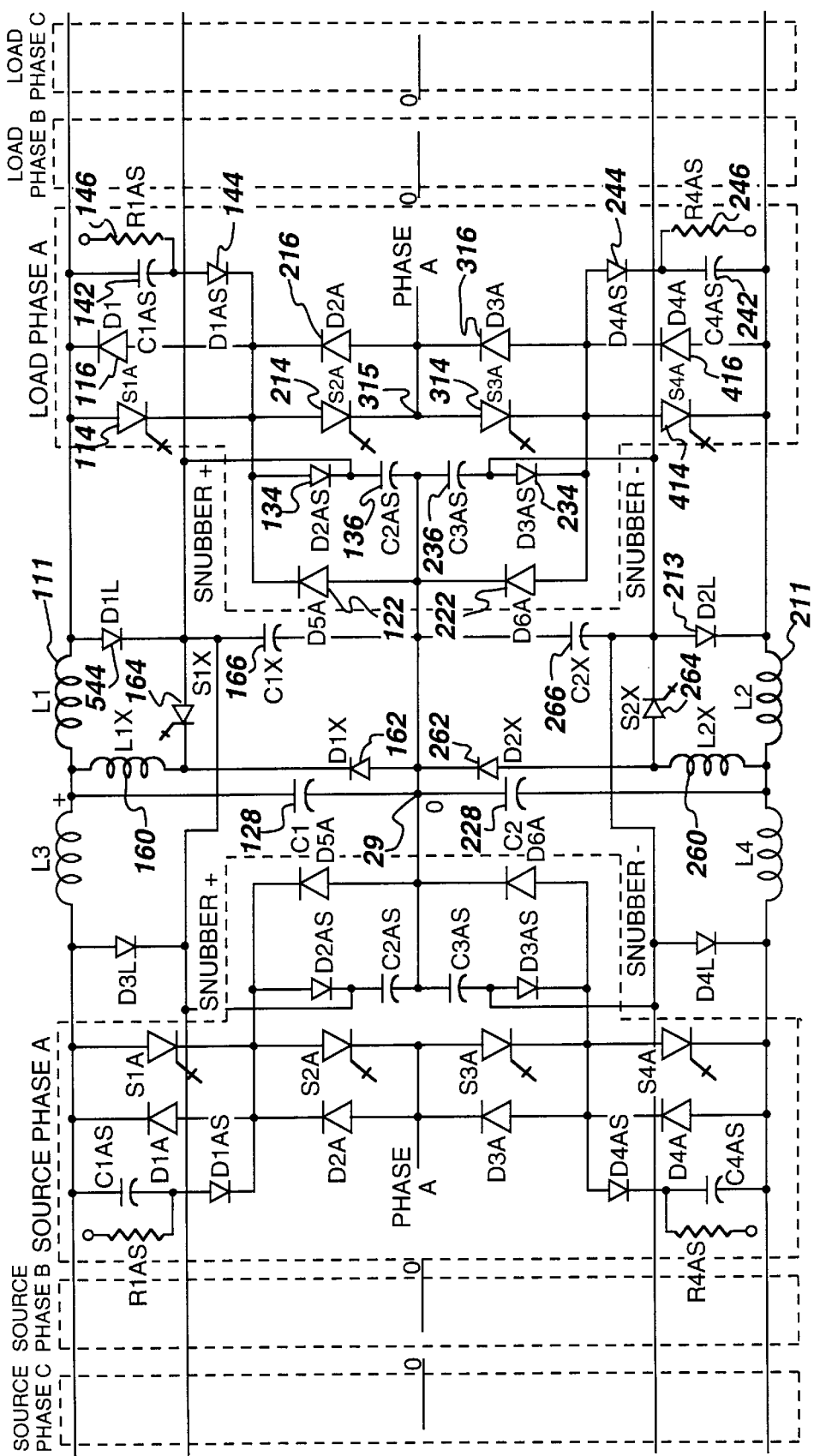
FIG. 10 is a circuit diagram of the regenerative voltage clamp snubber embodiment of FIG. 9 in a back-to-back converter system.

FIG. 10 is a circuit diagram of the regenerative voltage clamp snubber embodiment of FIG. 9 used in a voltage clamp snubber in the four quadrant back-to-back converter system of FIG. 8. Preferably, the snubber bus and regenerative buck converters can be shared between the two back-back converters.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

We claim:

1. A three-level neutral point clamped (NPC) converter comprising:

(a) first and second link capacitors coupled in series at a neutral junction, the first link capacitor further coupled to a positive DC bus, the second link capacitor further coupled to a negative DC bus;

(b) at least one phase leg including
first and second electrical switches coupled in series as a first pair of switches at a first pair junction,
third and fourth electrical switches coupled in series as a second pair of switches at a second pair junction,
the first and second pairs of switches coupled together in series at a series junction, the first pair of switches coupled to the positive DC bus, the second pair of switches coupled to the negative DC bus,
four anti-parallel freewheeling diodes, each freewheeling diode coupled in parallel to a respective one of the switches;
first and second clamping diodes, the first clamping diode coupled at the first pair junction, the second clamping diode coupled at the second pair junction, the first and second clamping diodes coupled in series at the neutral junction,
first and second inner switch snubber capacitors coupled in series at the neutral junction, and first and second inner switch snubber diodes, the first inner switch snubber diode coupled to the first pair junction and coupled at a first inner diode-capacitor junction to the first inner switch snubber capacitor, the second inner switch snubber diode coupled to the second pair junction and coupled at a second inner diode-capacitor junction to the second inner switch snubber capacitor; and (c) at least one pair of first and second inner switch snubber resistors, the first inner switch snubber resistor coupled between the first inner diode-capacitor junction of the at least one phase leg and the positive DC bus, the second inner switch snubber resistor coupled between the second inner diode-capacitor junction of the at least one phase leg and the negative DC bus.

2. The NPC converter of claim 1 wherein the at least one phase leg comprises three phase legs, wherein the first inner switch snubber resistor is coupled between first inner diode-capacitor junctions of each of the three phase legs and the positive DC bus, and wherein the second inner switch snubber resistor is further coupled between second inner diode-capacitor junctions of each of the three phase legs and the negative DC bus.

3. The NPC inverter of claim 1 further including a
a first reactor on a portion of the positive DC bus coupling the first link capacitor and the first pair of electrical switches,
a first reactor reset diode coupled between the first inner diode-capacitor junction and a portion of the positive DC bus between the first reactor and the first pair of electrical switches,
wherein the first inner switch snubber resistor is coupled to a portion of the positive DC bus between the first link capacitor and the first reactor and serves as a first reactor reset resistor,
a second reactor on a portion of the negative DC bus coupling the second link capacitor and the second pair of electrical switches,
a second reactor reset diode coupled between the second inner diode-capacitor junction and a portion of the negative DC bus between the second reactor and the second pair of electrical switches,
wherein the second inner switch snubber resistor is coupled to a portion of the negative DC bus between the second link capacitor and the second reactor and serves as a second reactor reset resistor.

4. The NPC converter of claim 1 wherein the at least one phase leg further includes:
first and second outer switch snubber diodes, the first outer switch snubber diode coupled to the first pair junction, the second outer switch snubber diode coupled to the second pair junction;

first and second outer switch snubber capacitors, the first outer switch snubber capacitor coupled between the first outer switch snubber diode at a first outer diode-capacitor junction and the positive DC bus, the second outer switch snubber capacitor coupled between the second outer switch snubber diode at a second outer diode-capacitor junction and the negative DC bus; and first and second outer switch snubber resistors, the first outer switch snubber resistor coupled between the first outer diode-capacitor junction and the neutral junction, the second outer switch snubber resistor coupled between the second outer diode-capacitor junction and the neutral junction.

5. The NPC converter of claim 1 wherein the at least one phase leg further includes first and second outer switch snubber diodes, the first outer switch snubber diode coupled between the first inner diode-capacitor junction and the positive DC bus, the second outer switch snubber diode coupled between the second inner diode-capacitor junction and the negative DC bus.

6. The NPC converter of claim 5 wherein the at least one phase leg further includes first and second outer switch snubber capacitors, the first outer switch snubber capacitor coupled in parallel with the first inner switch snubber capacitor, the second outer switch snubber capacitor coupled in parallel with the second inner switch snubber capacitor.

7. The NPC converter of claim 3 further including first and second reset capacitors, the first reset capacitor coupled in parallel to the first reactor reset resistor, the second reset capacitor coupled in parallel to the second reactor reset resistor.

8. A three-level neutral point clamped (NPC) converter comprising:
(a) first and second link capacitors coupled in series at a neutral junction, the first link capacitor being further coupled to a positive DC bus, the second link capacitor further coupled to a negative DC bus;
(b) at least one phase leg including
first and second electrical switches coupled in series as a first pair of switches at a first pair junction,
third and fourth electrical switches coupled in series as a second pair of switches at a second pair junction, the first and second pairs of switches coupled together in series at a series junction, the first pair of switches coupled to the positive DC bus, the second pair of switches coupled to the negative DC bus,
four anti-parallel freewheeling diodes, each freewheeling diode coupled in parallel to a respective one of the switches;
first and second clamping diodes, the first clamping diode coupled at the first pair junction, the second clamping diode coupled at the second pair junction, the first and second clamping diodes coupled in series at the neutral junction,
first and second inner switch snubber capacitors coupled in series at the neutral junction,
first and second inner switch snubber diodes, the first inner switch snubber diode coupled to the first pair junction and coupled at a first inner diode-capacitor junction to the first inner switch snubber capacitor, the second inner switch snubber diode coupled to the second pair junction and coupled at a second inner diode-capacitor junction to the second inner switch snubber capacitor
(c) first and second reactor inductors, the first reactor inductor situated on a portion of the positive DC bus coupling the first link capacitor and the first pair of electrical switches, the second reactor inductor situated on a portion of the negative DC bus coupling the second link capacitor and the second pair of electrical switches;
(d) first and second buck converters for recovering excess energy from the first and second inner switch snubber capacitors.

9. The NPC converter of claim 8 wherein the first buck converter comprises
a first converter inductor coupled to the positive DC bus,
a first converter diode coupled to the neutral junction, the first converter inductor and the first converter diode coupled at a first inductor-diode junction,
a first converter capacitor coupled to the neutral junction;
a first converter switch coupled to the first inductor-diode junction and to the first converter capacitor at a first capacitor-switch junction, the first capacitor-switch junction coupled to the first inner diode-capacitor junction;
and wherein the second buck converter comprises:
a second converter inductor coupled to the negative DC bus,
a second converter diode coupled to the neutral junction, the second converter inductor and the second converter diode coupled at a second inductor-diode junction,
a second converter capacitor coupled to the neutral junction;
a second converter switch coupled to the second inductor-diode junction and to the second converter capacitor at a second capacitor-switch junction, the second capacitor-switch junction coupled to the second inner diode-capacitor junction.

10. The NPC converter of claim 9 further including:
first and second outer switch snubber diodes, the first outer switch snubber diode coupled between the first inner diode-capacitor junction and the positive DC bus, the second outer switch snubber diode coupled between the second inner diode-capacitor junction and the negative DC bus; and
first and second outer switch snubber capacitors, the first outer switch snubber capacitor coupled in parallel with the first inner switch snubber capacitor, the second outer switch snubber capacitor coupled in parallel with the second inner switch snubber capacitor.

11. A three-level neutral point clamped (NPC) converter comprising:
(a) first and second link capacitors coupled in series at a neutral junction, the first link capacitor further coupled to a positive DC bus, the second link capacitor further coupled to a negative DC bus; and
(b) at least one phase leg including
first and second electrical switches coupled in series as a first pair of switches at a first pair junction,
third and fourth electrical switches coupled in series as a second pair of switches at a second pair junction, the first and second pairs of switches coupled together in series at a series junction, the first pair of switches coupled to the positive DC bus, the second pair of switches coupled to the negative DC bus,
four anti-parallel freewheeling diodes, each freewheeling diode coupled in parallel to a respective one of the switches;
first and second clamping diodes, the first clamping diode coupled at the first pair junction, the second clamping diode coupled at the second pair junction, the first and second clamping diodes coupled in series at the neutral junction, first and second outer switch snubber capacitors, the first outer switch snubber capacitor coupled to the positive DC bus, the second outer switch snubber capacitor coupled to the negative DC bus; and first and second outer switch snubber diodes, the first outer switch snubber diode coupled to the first pair junction and coupled at a first outer diode-capacitor junction to the first outer switch snubber capacitor, the second outer switch snubber diode coupled to the second pair junction and coupled at a second outer diode-capacitor junction to the second outer switch snubber capacitor, and first and second outer switch snubber resistors, the first outer switch snubber resistor coupled between the first outer diode-capacitor junction of the at least one phase leg and the neutral junction, the second outer switch snubber resistor coupled between the second outer diode-capacitor junction of the at least one phase leg and the neutral junction.

* * * * *